(12) United States Patent
Mantri et al.

(10) Patent No.: US 8,504,933 B2
(45) Date of Patent: Aug. 6, 2013

(54) TRANSLATING OVERLAPPING STATES INTO REPRESENTATIVE STATES

(75) Inventors: Siddharth Mantri, Seattle, WA (US); Charles Robert Stoner, Seattle, WA (US); Roger Allen Lueder, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 367 days.

(21) Appl. No.: 12/790,044

(22) Filed: May 28, 2010

(65) Prior Publication Data

US 2011/0296342 A1    Dec. 1, 2011

(51) Int. Cl.
    *G06F 3/048* (2006.01)
(52) U.S. Cl.
    USPC .......... 715/771; 715/790; 715/808; 715/835; 715/836; 713/320
(58) Field of Classification Search
    USPC ................ 715/808, 771; 713/320
    See application file for complete search history.

(56) References Cited

U.S. PATENT DOCUMENTS

| | | | |
|---|---|---|---|
| 5,285,792 A * | 2/1994 | Sjoquist et al. | 600/510 |
| 6,295,049 B1 * | 9/2001 | Minner | 715/856 |
| 6,891,809 B1 | 5/2005 | Ciccone et al. | |
| 7,065,663 B2 * | 6/2006 | Sheller | 713/320 |
| 7,117,380 B2 * | 10/2006 | Kangas | 713/320 |
| 7,363,108 B2 | 4/2008 | Noda et al. | |
| 2001/0055029 A1 * | 12/2001 | Nakajima et al. | 345/629 |
| 2005/0289366 A1 * | 12/2005 | Reilly | 713/300 |
| 2008/0233958 A1 | 9/2008 | Robbins et al. | |
| 2010/0217477 A1 * | 8/2010 | Brody | 701/29 |
| 2011/0194679 A1 * | 8/2011 | Patisaul et al. | 379/142.04 |

OTHER PUBLICATIONS

"Transitions", Retrieved at <<http://developer.apple.com/safari/library/documentation/InternetWeb/Conceptual/SafariVisualEffectsProgGuide/Transitions/Transitions.html>>, Retrieved Date : Mar. 25, 2010, pp. 1-4.
Wood, et al., "Stable Control of Distributed Hysteretic Systems Using Cellular Broadcast Stochastic Feedback", Retrieved at <<http://www.nt.ntnu.no/users/skoge/prost/proceedings/acc09/data/papers/0359.pdf >>, Proceedings of the 2009 conference on American Control Conference, Jun. 10-12, 2009, pp. 3519-3524.
Mhatre, et al., "Using Smart Triggers for Improved User Performance in 802.11 Wireless Networks", Retrieved at <<http://www.usenix.org/events/mobisys06/full_papers/p246-mhatre.pdf>>, International Conference on Mobile Systems, Applications and Services, Proceedings of the 4th international conference on Mobile systems, applications and services, Jun. 19-22, 2006, pp. 246-259.

(Continued)

*Primary Examiner* — Alvin Tan

(57) ABSTRACT

A computer application program can comprise multiple overlapping states associated with functionality or components of the application program. Simultaneous output of all such states can be impractical. Representative states can be defined in terms of the statuses of individual states relevant to a particular representative state. Additionally, representative states can be ranked, where multiple representative states that share the same ranking can overlap with each other, but not with other representative states. To avoid transitioning between states too quickly, and presenting output for too short a time, hysteresis mechanisms can be applied in the form of a set delay, a reset delay or a combination thereof. The duration of the set and reset delay can be established independently of each other and independently for each state. The output can be in accordance with the representative state associated with the current statuses of individual states, accounting for selected hysteresis mechanisms.

14 Claims, 4 Drawing Sheets

OTHER PUBLICATIONS

Dragovic, et al., "Information Exposure Control through Data Manipulation for Ubiquitous Computing", Retrieved at <<http://delivery.acm.org/10.1145/1070000/1066036/p57-dragovic.pdf?key1=1066036&key2=0515339621&coll=GUIDE&dl=GUIDE&CFID=83126599&CFTOKEN=41535868 >>, New Security Paradigms Workshop, Proceedings of the 2004 workshop on New security paradigms, Sep. 20-23, 2004, pp. 57-64.

Harel, et al., "On Statecharts with Overlapping", Retrieved at <<http://delivery.acm.org/10.1145/140000/136589/p399-harel.pdf?key1=136589&key2=4546949621&coll=GUIDE&dl=GUIDE&CFID=83415011&CFTOKEN=84007153>>, ACM Transactions on Software Engineering and Methodology (TOSEM), vol. 1, No. 4, Oct., 1992, pp. 399-421.

Harel, et al., "Statecharts: A Visual Formalism for Complex Systems", Retrieved at <<http://citeseerx.ist.psu.edu/viewdoc/download?doi=10.1.1.20.4799&rep=rep1&type=pdf >>, Science of Computer Programming, vol. 8, No. 3, Jun. 1, 1987, pp. 231-274.

* cited by examiner

TRANSLATING OVERLAPPING STATES INTO REPRESENTATIVE STATES

BACKGROUND

Computer application programs, such as those comprised of computer-executable instructions executed on a computing device, traditionally provide some form of information output, either in the form of information presented to a user through a user interface, information stored or presented on some form of logging or recording medium, or a combination thereof. In many cases, the computer executable instructions of a computer application program may be performing many tasks simultaneously. Informational output from, or associated with, every one of these simultaneously performed tasks may overwhelm a user or a logging or recording medium. For example, if a user were to receive information from a computer application program informing the user of every task that that computer application program was performing, the amount of information presented to the user would be greater than could be meaningfully understood by the user. As a result, the user would likely ignore much, if not all, of the information presented by the computer application program. Similarly, depending on the logging or recording medium, and on the environment within which such a logging or recording medium is being utilized, too much outputted information could exhaust the recording medium, such as in an environment in which the recording medium can be difficult or impractical to replace or replenish.

Conversely, over-filtering the informational output of an application program can be likewise detrimental in that the user may perceive that the application program is idling when, in fact, the application program is performing one or more tasks, or the log or other record created from the informational output of such an application program can comprise insufficient information to be utilized as intended. Consequently, the selection of which information to output from application program may need to be carefully undertaken.

In many cases computer application programs are divided into components or discrete functionality, such that the functional state of an application program at any time can be expressed as a combination of functional states associated with the components or functionality of the application program. As a simple example, a syncing application program can perform the discrete functions of examining files, transmitting files, and receiving files. At any point in time, such an application program can be performing any one or more of these discrete functions and its functional state can be expressed in terms of which one or more of these discrete functions are currently performing. For such an application program, the above-described output selection problem translates into a problem of which, if any, state is to be output, such as to a user or to a recording or logging medium.

SUMMARY

In one embodiment, two or more individual states of application program that can overlap with one another can be unified into one or more representative states that can be output. The potential informational output of the application program can be reduced to the output of one or more of the representative states.

In another embodiment, the representative states can be defined by the status of individual states, and can be ranked in order of output importance such that, if two or more representative states are equally defined by the current status of individual states, the higher-ranked representative states can be output to the exclusion of lower ranked representative states.

In a further embodiment, a hysteresis mechanism can be utilized to minimize transitions between output representative states that occur in too rapid a succession, such as transitioning too quickly to meaningfully transfer information to the user. The hysteresis mechanism can employ a delay in outputting a representative state, a delay in ceasing the output of a representative state, or a combination thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
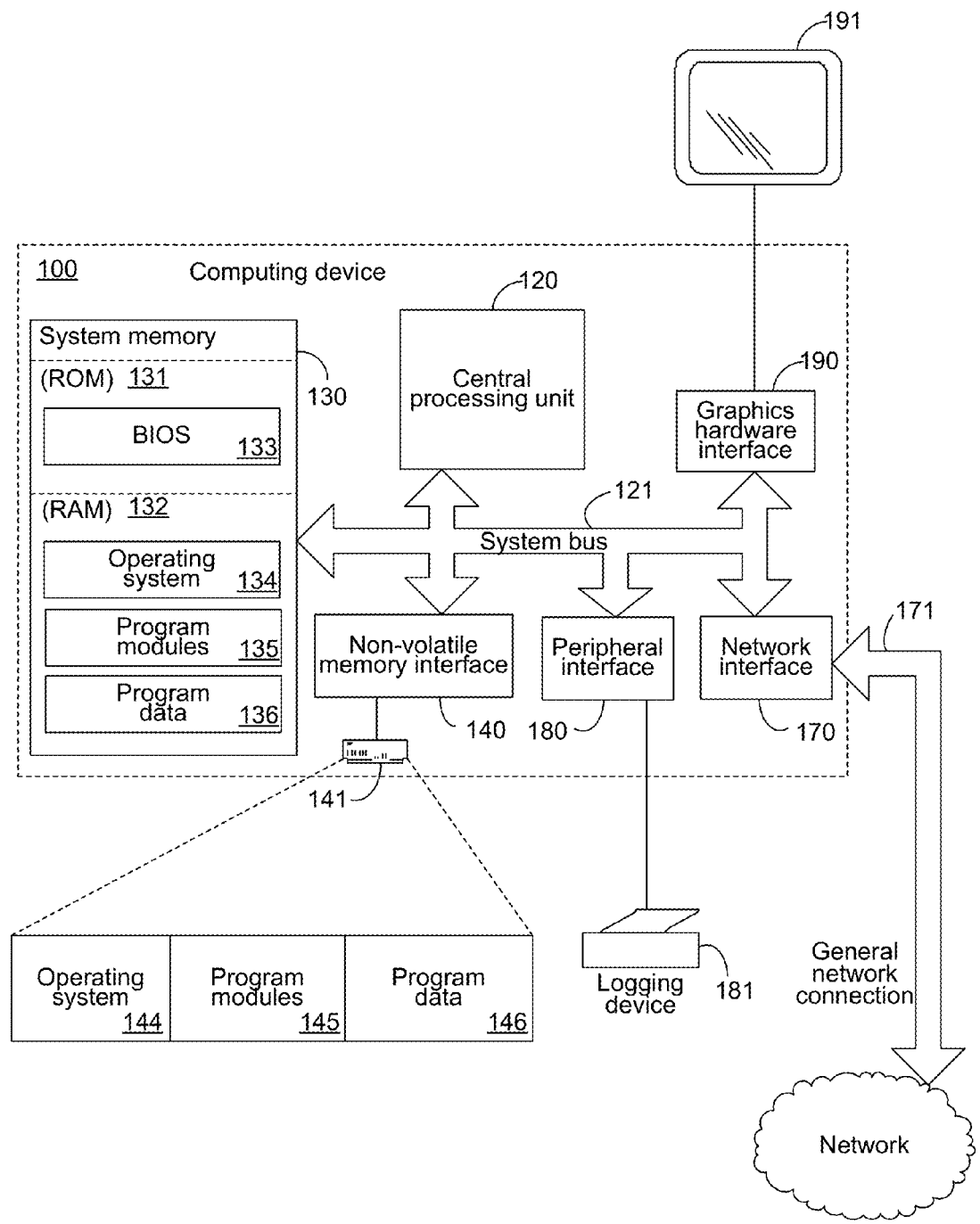
FIG. 1 is a block diagram of an exemplary computing device.

The following description relates to the translation of overlapping states into representative states. The representative states can be selected to filter the output information based upon the individual states to which they are related. More specifically, each representative state can comprise either an amalgamation, a filtering, or a combination thereof, of information relevant to each individual state. The representative states can then be assigned a ranking, such that, when the current status of individual states is relevant to one or more representative states, the higher ranked representative state can be selected as the output. Additionally, hysteresis can be applied to prevent the outputted representative states from transitioning too quickly.

For purposes of illustration, the techniques described herein make reference to specific types of exemplary states and exemplary computer application programs. Such references are strictly to provide examples for ease of presentation and understanding and are not intended to limit the mechanisms described to the specific examples provided. Indeed, the techniques described are applicable to any computer-executable instructions that comprise individual components or states that can operate independently, or otherwise change independently.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated upon which, and in conjunction with which, the below-described mechanisms can be implemented. The exemplary computing device 100 of FIG. 1 can include, but is not limited to, one or more central processing units (CPUs) 120, a system memory 130, that can include RAM 132, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, such as for the display of visual user interfaces, including, but not limited to, a graphics hardware interface 190 and a display device 191. Although not shown, the computing device 100 can also include types of user output elements, including, but not limited to speakers, Braille output devices and the like.

The computing device 100 can further comprise other forms of informational output devices, such as the logging device 181 that can be communicationally coupled to the system bus 121 via the peripheral interface 180. Such a logging device 181 can include devices that generate printed logs, such as can be utilized in remote reporting environments, or a data logging device, such as can store output information on computer-readable media, such as that described below.

The computing device 100 itself, independently of any logging devices 181, also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and the aforementioned RAM 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates the operating system 134 along with other program modules 135, and program data 136.

The computing device 100 may also include other removable/non-removable, volatile/nonvolatile computer storage media. By way of example only, FIG. 1 illustrates the hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 can operate in a networked environment using logical connections to one or more remote computers. The computing device 100 is illustrated as being connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The program modules 135 can include one or more computer application programs that can comprise components or functional aspects that can be expressed in terms of individual states. For example, the program modules 135 can comprise a synchronization computer application program that comprises computer-executable instructions for performing various functions, either individually, or simultaneously. Among the various functions that can be performed by the exemplary synchronization program can be an analysis of the two or more sets of data to be synchronized, an identification of the differences between the two or more sets of data that are to be accommodated through synchronization, the transmission of data from one set to another for purposes of synchronization, and the receipt of data from one site to another for purposes of synchronization.

The exemplary synchronization program can seek to provide some sort of informational output, such as to a user of the computing device 100, to, for example, inform the user that the exemplary synchronization program is actually doing something. Thus, if the user had instructed the exemplary synchronization program to synchronize two or more sets of data, and received no further informational output, the user might have no way of knowing whether the synchronization program was actually performing the requested synchronization, how long the requested synchronization may take, or if there were any problems encountered with the requested synchronization. At the same time, however, the user does not seek to be bombarded with continuous informational output from the synchronization program. For example, if the user is expecting the synchronization program to be sending and receiving data for purposes of performing synchronization, the user may not care that the synchronization program is, simultaneously, identifying the differences between the two or more sets of data that is attempting to synchronize.

For purposes of the below descriptions each of the various functions described above can be conceptualized as an individual state. For example, the function of analyzing the two or more sets of data that are to be synchronized can be conceptualized as an individual analysis state that can either be "on", meaning that the analyzing is currently being performed, or it can be "off", meaning that the analyzing is not currently being performed. The other functions described above can be similarly conceptualized as individual states. However, as indicated previously, and as will be realized by those skilled in the art, the exemplary functions are provided only as examples, as the below descriptions are equally applicable to any type of individual state of a functional aspect, or component, of a computer application program.

The various individual states may be able to transition between their "on" and "off" states independently of one another. For example, the individual analysis state may transition between "on" and "off" state, meaning that the analysis of the data to be synchronized may start occurring, or stop occurring, independently of, for example, the individual receiving state that represents whether or not data is being received by the synchronization program. For purposes of the below descriptions such individual states can be referred to as "orthogonal", since the behavior of one state does not impact the other, and both states can transition between their "on" and "off" states independently of one another.

When considered in the context of informational output, such as the information to be presented to a user of the computing device 100, such as via the graphics display 191, such orthogonal states can result in multiple components of informational output being provided to the users simultaneously. Thus, returning to the above example, the user may be simultaneously notified that the synchronization program is analyzing data to be synchronized, and is, thus, in an analyzing state, and that it is receiving data for synchronization purposes, and is, thus, simultaneously, in a receiving state. Realistically, however, as an example, the user may only care about the receiving of data, unless no data is being received, in which case the user may care about the analysis of data for synchronization purposes. In other words, even though two states exist simultaneously, they can be aggregated into a single state which indicates only the receiving of data, when that is being performed, and only indicates the analyzing state when another, more important, state (such as the receiving state) is not overlapping. More broadly, were each individual state allowed to output its current status independently of one another, the aggregate informational output provided by an application program, such as the exemplary synchronization application program described above, may be excessive. To reduce and filter such informational output, representative states can be created that represent only a portion of the aggregate informational output that can be provided by the application program.

Turning to Table 1, below, an exemplary table is provided illustrating how individual states can be coalesced into one or more representative states. In the exemplary table, the individual state A can represent a state that can be deemed to be of importance to, for example, the user, or other consumer of the output of the application program. As such, as shown in Table 1, if the individual state A is "on" than the status of the remaining states can be deemed to be irrelevant and a representative state Z can be assigned to such a combination of individual states. Thus, for example, if the receiving of data was deemed to be the most important action performed by the exemplary synchronization application program, a table, such as the exemplary Table 1 below, can be created such that, if the receiving state was "on" the status of the remaining individual states would be irrelevant and the corresponding representative state could simply be a state that indicates that the exemplary synchronization program is receiving data. In such an example, so long as the synchronization program was receiving data, the user would be informed of such receipt of data and would not be informed of other actions by the synchronization program, even if such other actions were occurring simultaneously.

TABLE 1

Relating Individual States ("Indv. State") and Representative States ("Rep. State")

| Indv. State A | Indv. State B | Indv. State C | Indv. State D | Stack Rank | Rep. State |
|---|---|---|---|---|---|
| 1 | ... | ... | ... | 1 | Rep. State Z |
| 0 | 1 | ... | ... | 2 | Rep. State Y |
| 0 | ... | 1 | ... | 2 | Rep. State Y' |
| 0 | 0 | 0 | 1 | 3 | Rep. State X |
| 0 | 0 | 0 | 0 | 4 | Rep. State W |

In one embodiment, two or more collections of individual state statuses can have an equal ranking, such that the representative states assigned to such collections of individual state statuses may overlap one another, but collectively, do not overlap the other representative states. Thus, as shown in the exemplary Table 1 above, individual states B and C can be the type of states such that if either state is "on" an equal ranking can be assigned to the corresponding representative state Y or Y'. In such a case, the informational output associated with the representative state Y can be displayed simultaneously with the informational output associated with the representatives state Y' and the representative states Y and Y' could overlap one another. None of the other representative states, however, as can be seen from Table 1, can overlap either, or both, of Y or Y'. Returning to the above exemplary synchronization program, the state of receiving data may be equally as important as the state of sending data. In such an example, one representative state can represent the collection of individual state statuses in which the state of receiving data is "on" and all of the other individual state statuses are irrelevant, and another representative state can represent a collection of individual state statuses in which the state of sending data is "on" and all of the other individual state statuses are irrelevant. If both representative states are applicable, given the current collection of individual state statuses, both the informational output regarding the sending of data and informational output regarding the receiving of data can be output. Thus, as shown in Table 1, discrete collections of individual state statuses can result in representative states that have an equal ranking.

Figure 2:
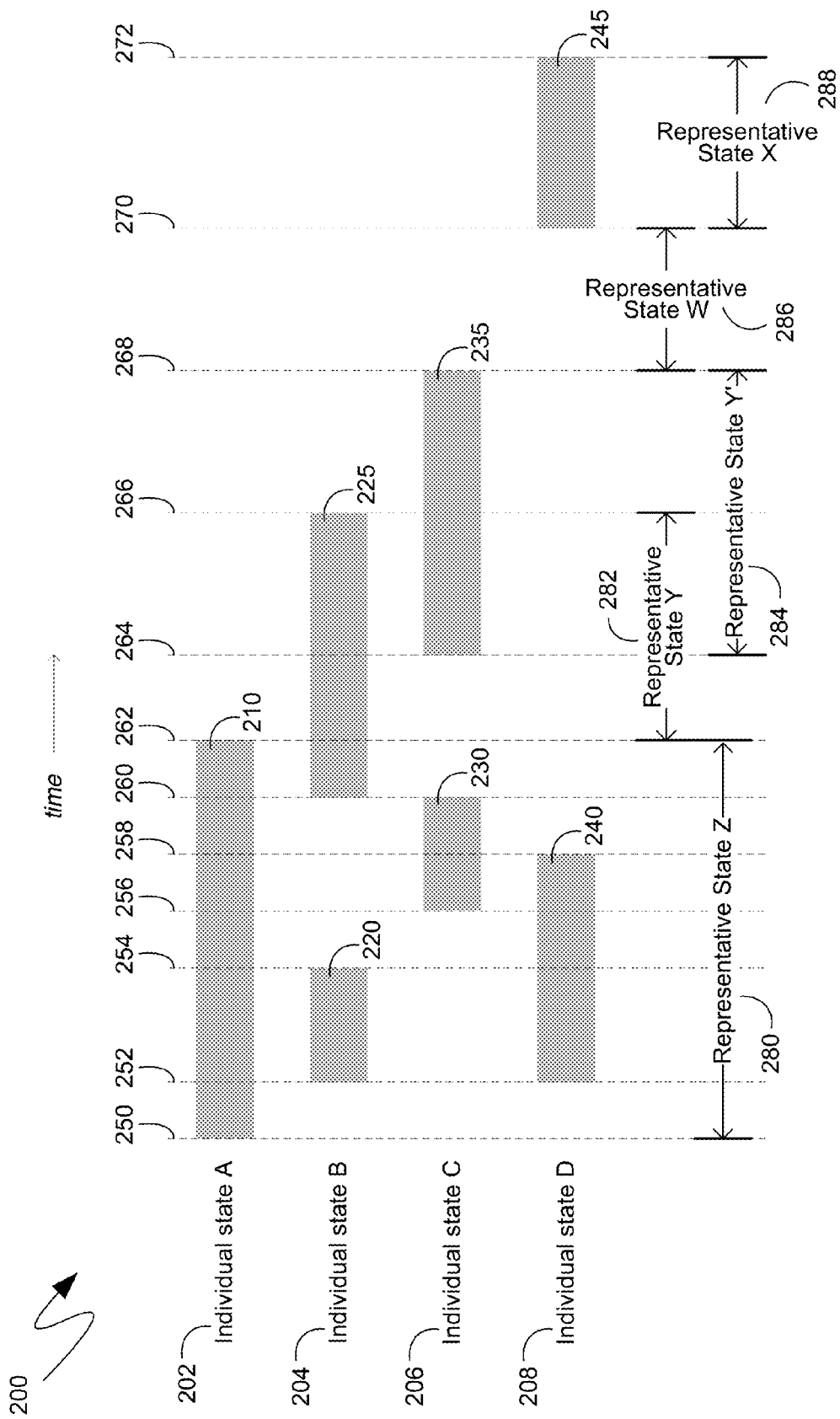
FIG. 2 is a temporal diagram of exemplary individual and representative states.

Once a table, such as the exemplary Table 1 shown and described above, is generated, such a table can be utilized to assign representative states given a current collection of individual state statuses. Turning to FIG. 2, the system 200 shown therein illustrates an exemplary temporal indication of the status of individual states A, B, C and D 202, 204, 206 and 208, respectively over a period of time from time 250 until time 272. Additionally, the system 200 shown in FIG. 2 illustrates an exemplary assignment of representative states Z, Y, Y', W and X, 280, 282, 284, 286 and 288, respectively, given the status of individual states A, B, C and D 202, 204, 206 and 208, respectively. Thus, for example, as shown in FIG. 2, the individual state A 202 can be in an "on" condition from time 250 until time 262, as illustrated by the "on" period 210. Referring to the exemplary Table 1, above, if the individual state A 202 is experiencing an "on" condition, the status of the remaining individual states can be irrelevant, and the resulting representative state can be found to be the representative state Z 280. Thus, as shown in FIG. 2, the representative state Z 280 can similarly extend from time 250 until time 262.

In situations where representative states can both be assigned the same ranking, such representative states can temporally overlap, as also shown in the system 200 FIG. 2. More specifically, the individual state B 204 can be in an "on" condition from time 260 until time 266, as illustrated by the "on" period 225. Referring back again to the exemplary Table 1, so long as the individual state A 202 is in an "on" condition, the status of the individual state B 204 can be irrelevant. Thus, because the individual state A 202 is in an "on" condition until the time 262, the representative state Z 280 can remain until the time 262 even though the individual state B 204 transitioned to an "on" condition at time 260, which, as shown, is prior to time 262. Similarly, individual state B 204 can have been in an "on" condition from time 252 until time 254, as illustrated by the "on" period 220, prior to time 260, without, again, changing the representative state Z 280 prior to time 262. The same can be true for the "on" periods 230 and 240 of individual states C and D 206 and 208, respectively, from time 256 until time 260 and from time 252 until time 258, respectively.

However, at time 262, the individual state A 202 can transition to an "off" condition, while the individual state B 204 can remain in "on" condition. Turning back to the exemplary Table 1, a collection of individual state statuses where the individual state A 202 is in an "off" condition and the individual state B 204 is in an "on" condition can correspond to the representative state Y 282. Thus, as shown in the system 200 of FIG. 2, the representative state Y 282 can be outputted from time 262 until time 266. Such can be true even if another representative state having the same ranking temporarily overlaps the representative state Y 282. For example, as shown in FIG. 2, the individual state C 206 can transition to an "on" condition at time 264 and can remain in such a condition until time 268 as illustrated by the "on" period 235. As defined in the exemplary Table 1, a collection of individual state statuses were the individual state C 206 is in an "on", and the individual state A 202 is in an "off" condition, can correspond to the representative state Y' 284. The representative state Y' 284 can have the same ranking as the representative state Y 282 and, consequently, can temporally coexist with the representative state Y 282. Thus, as shown in FIG. 2, from time 264 until time 266, two representative states can be output simultaneously, namely representative state Y 282 and representative state Y' 284. At time 266, the individual state B 204 can transition to an "off" condition, and the representative state Y 282 can end leaving only the representative state Y' 284 to be output.

To complete the description of the exemplary temporally-based system 200 of FIG. 2, at time 268 the individual state C 206 can transition to an "off" condition and none of the individual states can be in an "on" condition. Referring again to the exemplary Table 1, the representative state W 286 can be associated with the collection of individual state statuses where no individual state is in an "on" condition. Thus, as shown in FIG. 2, the representative State W 286 can extend from time 268 until time 270, at which point the individual state D 208 can transition to an "on" condition as shown by the "on" period 245. Per the exemplary Table 1 a collection of individual state statuses where only the individual state D 208 is in the "on" condition can correspond to the representative state X 288, and such a representative state can be output from the time 270 until the time 272 at the individual state D 208 is in the "on" condition and no other individual state is in the "on" condition.

Figure 3:
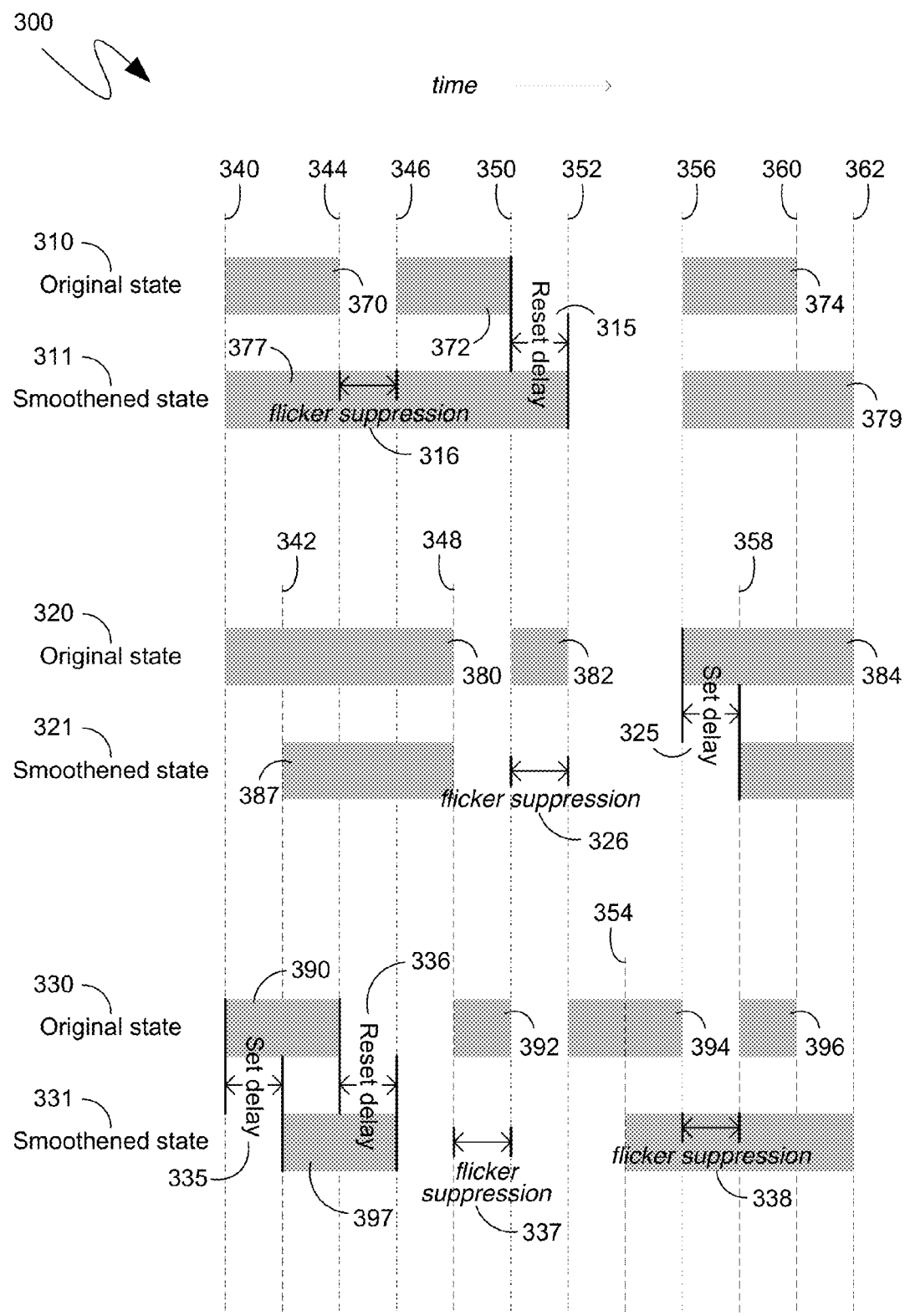
FIG. 3 is a temporal diagram of exemplary hysteresis mechanisms.

Turning to FIG. 3, the exemplary system 300 shown therein illustrates multiple examples of hysteresis mechanisms that can be applied to prevent transitions between states that occur too quickly, including transitions between individual states, prior to the determination of a representative state, or transitions between the representative states. More specifically, as will be known by those skilled in the art, when information is output to a user, such as through a user interface, such information must remain visible for a sufficient period of time for the user to be able to read and understand the information. Were a computer application program to display information for only a split-second, for example, such information would be completely meaningless to a human user, since the human user could not have even read the information presented, let alone comprehended it and understood it. Consequently, in certain circumstances, it can be useful to ensure that information that is presented remains presented for a sufficiently long period of time. Similarly, in certain circumstances, it can be useful to ensure that information that may only be relevant for a very short period of time does not get presented at all, such as, for example, to avoid user confusion. The hysteresis mechanisms described below with reference to the system 300 of FIG. 3 provide exemplary mechanisms for ensuring that presented information remains presented for a sufficiently long period of time, or is simply not presented at all, thereby avoiding "flicker" or similar situations where information is presented, such as visually, for too short a period of time to be useful.

One form of hysteresis that can be applied is a reset delay, such as the reset delay 315 shown in the system 300 of FIG. 3. More specifically, an original state 310 can be in an "on" condition from the time 340 until the time 344, as illustrated by the "on" period 370, and can again be in an "on" condition from the time 346 until the time 350, as illustrated by the "on" period 372. In essence, the original state 310 can be in an "on" condition continuously from time 340 until time 350, with the exception of a very short interruption between time 344 and time 346. Were the original state 310 to be output to the user without hysteresis, the result of the short transition to the "off" condition between time 344 and time 346 would be a "flicker" in which the output of the original state 310 would cease, and then reappear, sufficiently quickly to seem as if the output had merely flickered instead of actually having transitioned to an "off" condition and then transitioned back to an "on" condition.

To avoid such a flickering, the reset delay 315 can be utilized. As can be seen from the exemplary system 300 of FIG. 3, a smoothed state 311 corresponding to the original state 310 can transition to an "on" condition at time 340, just like the original state 310. However, the smoothed state 311 can apply a reset delay 315 to delay transitioning to an "off" condition. Thus, for example, even though the original state 310 can have transitioned to an "off" condition at time 350, the smoothed state 311, applying the reset delay 315 between the time 350 and 352, can not transition to the "off" condition until time 352. The net result of such a reset delay 315 when, for example, applied to the time between time 344 and time 346, is that the flicker that would otherwise have occurred when the original state 310 transitioned between the "on" condition and the "off" condition at time 344 and then transitioned back at time 346 is suppressed in the smoothed state 311 as shown by the flicker suppression 316. The smoothed state 311 can, thereby, remain in an "on" condition continuously from time 340 until time 352, as shown by the "on" period 377, thereby avoiding the too rapid transitions occurring at time 344 and time 346 in the original state 310.

Of course, when the original state 310 does not experience transitions that are too rapid, and is instead in an "on" condition continuously, such as from time 356 until time 360, as represented by the "on" period 374, the net result of applying hysteresis in the form of a reset delay, such as the reset delay 315, is it that the smoothed state 311 can simply remain in an "on" condition for a longer period of time. Thus, as shown in FIG. 3, the smoothed state 311 can remain in an "on" condition from time 356 until time 363, as represented by the "on" period 379, where the difference between the time 360 at which the original state 310 transitioned to an "off" condition, and the time 363 at which the smoothed state 311 transitioned to the "off" condition, can be equivalent to the reset delay 315.

Another form of hysteresis that can be applied is a set delay 325 as also shown in the system 300 of FIG. 3. Specifically, an original state 320 can be in an "on" condition from time 356 until time 362, as represented by the "on" period 384. However, a corresponding smoothed state 321 can not transition to an "on" condition until a time after time 356, such as time 358, where the difference between the time 356 when the original state 320 transitioned to the "on" state and the time 358 when the smoothed state 321 transitioned to the "on" state can be the set delay 325. As with the reset delay 315, described in detail above, the set delay 325, when applied to types of transitions that can occur too quickly to provide meaningful output information within that amount of time, can reduce or eliminate the flicker that such transitions would cause if they were visually presented.

For example, as shown in FIG. 3, the original state 320 can be in an "on" condition from time 340 until time 348, as represented by the "on" period 380, and can again, briefly, be in an "on" condition from time 350 until time 352, as represented by the "on" period 382. The "on" period 382 can be very short in duration, such that, if the original state 320 were to be presented to a user, the duration of the "on" period 382 could be sufficiently short that by the time a user was made aware of it, it can already have ended. The smoothed state 321, by virtue of a set delay, can apply a flicker suppression 326 and never transition back to the "on" condition between time 350 and time 352. More specifically, applying a set delay, such as the set delay 325, the smoothed state 321 that corresponds to the original state 320 can not transition to an "on" condition until time 342 even though the corresponding original state 320 transitioned to the "on" condition at the earlier time 340. However, since the exemplary smoothed state 321 can not be applying a reset delay, it can transition to the "off" condition at time 348 coincident with the transitioning to the off condition of the corresponding original state 320. The "on" period 387 of the smoothed state 321 can, thereby, be slightly shorter in duration than a corresponding "on" period 380 of the original state 320.

In a similar manner, when considering the "on" period 382 of the original state 320, the smoothed state 321 can end up applying a flicker suppression 326, since the smoothed state 321 would, by virtue of the set delay, not transition to the "on" condition until time 352, by which point the original state 320, which had transitioned to the "on" condition at time 350, would have already transitioned to the "off" condition. Consequently, the smoothed state 321 would never transition to the "on" condition in the first place, and would instead remain in the "off" condition throughout the short period of time during which the original state 320 was in the "on" period 382.

In other embodiments, both a set delay and a reset delay can be applied simultaneously. For example, as shown in the system 300 of FIG. 3, an original state 330 can transition to an "on" condition at time 340 and transition to an "off" condition at time 344, resulting in an "on" period 390. A corresponding smoothed state 331 can implement both a set delay 335 and a reset delay 336 and can, thereby, transition to an "on" condition at time 342 after the set delay 335 and transition to an "off" condition at time 346 after the reset delay 336. As a result, the "on" period 397 of the smoothed state 331 can be temporally offset from the "on" period 390 of the original state 330.

However, by applying both a set delay, such as the set delay 335, and a reset delay, such as the reset delay 336, the smoothed state 331 can implement a flicker suppression 337 that can avoid transitioning to an "on" condition for too short a period of time and a flicker suppression 338 that can avoid transitioning to an "off" condition for too short a period of time. Thus, as shown in FIG. 3, the original state 330 can, very briefly, transition to an "on" condition between time 350 and time 352, as shown by the "on" period 392. However, for the same reasons described above in connection with the flicker suppression 326, the smoothed state 331, that is a result of an implemented set delay, can not correspondingly transition to the "on" condition and can, thereby, implement the flicker suppression 337. Similarly, the original state 330 can be in an "on" condition between time 352 and 356, as shown by the "on" period 394, and can again be in an "on" condition between time 358 and 360, as shown by the "on" period 396, with only a brief "off" period between time 356 and time 358. Because of the implementation of a set delay, such as the set delay 335, the smoothed state 331 can transition to an "on" condition at time 354, after the time 352 at which the original state 330 transitioned to the "on" condition, and can, because of the implementation of the reset delay, such as the recent delay 336, not transition to an "off" condition between time 356 and time 358, unlike the original state 330, thereby implementing the flicker suppression 338.

As can be seen from the above descriptions, application of one or more of the described hysteresis mechanisms can depend on the particular function or information being output. For example, if the informational output is such that it should be delivered as soon as possible, such as by being displayed to a user or being logged by a logging device, then a set delay may not be appropriate, but a reset delay may be advantageous to reduce flicker. Similarly, if the informational output is such that it need not be delivered as soon as possible, but should indicate the termination of a condition as accurately as possible, then a reset delay may not be appropriate, but a set delay may be advantageous to reduce flicker. Informational output that may not be under any temporal constraints can utilize both a set, and a reset, delay.

While the specific temporal durations of various times illustrated in FIG. 3 are not specifically enumerated, both the set delays and reset delays illustrated in the system 300 of FIG. 3 are shown of equal temporal duration. However, there is no inherent reason that a set delay and a reset delay must be of the same temporal duration and, indeed, it is contemplated that they can be established individually, and independently of one another. Similarly, specific states can have unique set, and reset, delays, such that, for example, the delays established with regard to one state are different from the delays established with regard to a different state.

Figure 4:
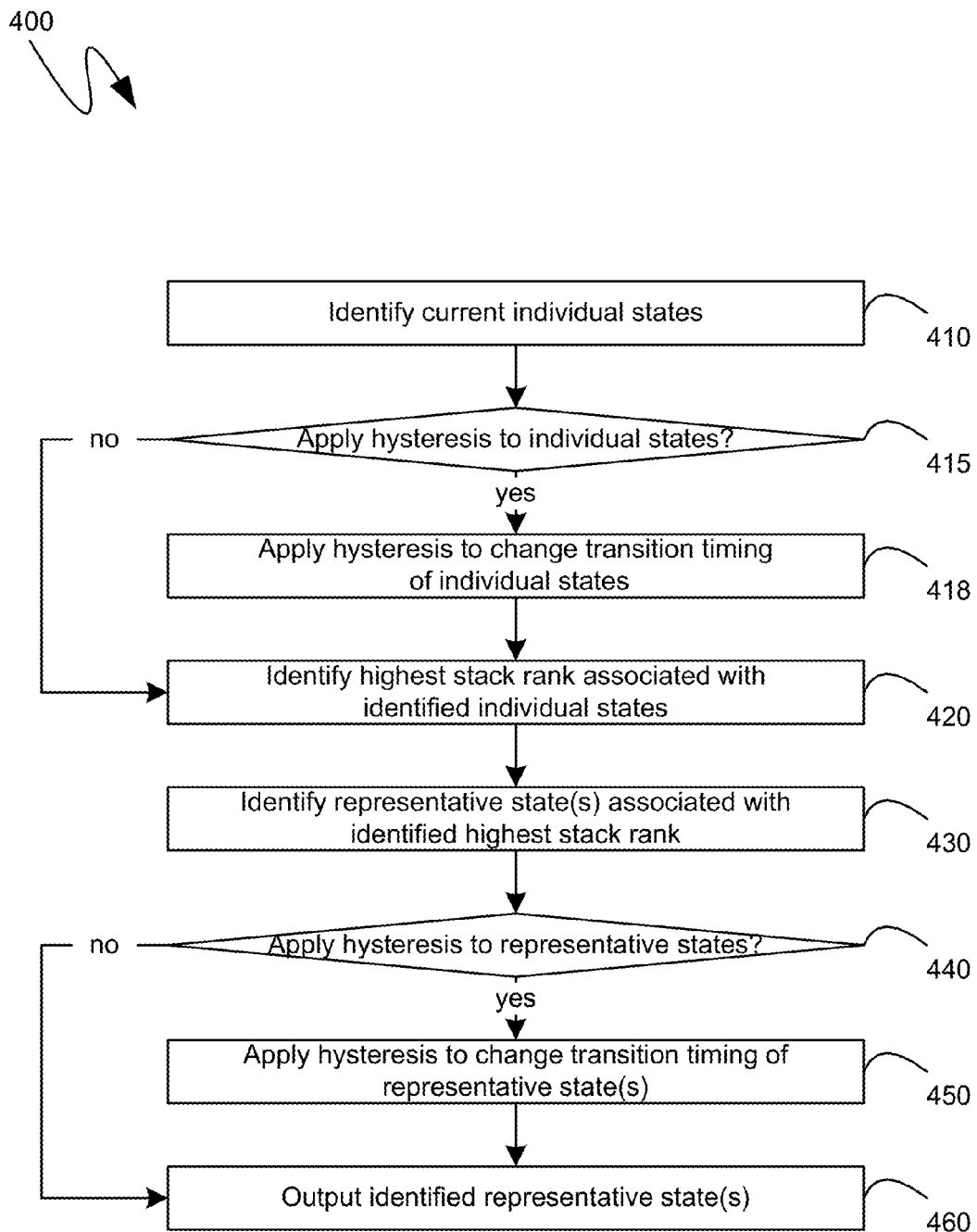
FIG. 4 is a flow diagram of an exemplary mechanism for outputting a representative state based on individual states.

Turning to FIG. 4, an exemplary flow diagram 400 shown therein illustrates an exemplary series of steps that can be performed to translate current individual state statuses into one or more aggregated, or representative, states utilizing the above described mechanisms. Thus, as shown, initially, at step 410, an identification of the current status of individual states can be performed. Subsequently, a determination can be made, at step 415, as to whether hysteresis is to be applied to one or more of the individual states identified at step 410. If no such a hysteresis is to be applied, as determined at step 415, then processing can proceed with step 420. However, if, at step 415, it is determined that hysteresis is to be applied to at least one of the individual states identified at step 410, processing can proceed to step 418, where the hysteresis can be applied, in essence potentially changing the individual state identified at step 410, at least temporarily, such as, for example, if a set or reset delay was applied. Processing can then proceed to step 420, where, based on the status of the individual states identified at step 410, taking into account any hysteresis that may have been applied at step 418, a table, such as the exemplary Table 1 described above, can be consulted and a highest ranking associated with the current status of the individual states can be identified at step 420. At step 430, one or more representative states, that are associated with the highest ranking found in step 420, can be identified.

At step 440, a decision can be made whether to apply one or more of the above-described hysteresis mechanisms to the representative states identified at step 430. If, at step 440, it is determined that no hysteresis mechanism is to be applied, then processing can proceed to step 460 at which point output in accordance with the one or more representative states identified at step 430 can be made. Conversely, if at step 440, it is determined that one or more hysteresis mechanisms are to be applied, processing can proceed to step 450 at which point the selected hysteresis mechanisms can be applied. The applied hysteresis, at step 450, can be to the one or more representative states identified at step 430 as opposed to the individual states, which can have had hysteresis applied to them, as described above with references to step 418. Thus, at step 450, that hysteresis application can be relevant only when the one or more representative states transition between an "on" and "off" condition, even if individual states transition between "on" and "off" conditions throughout the duration of the relevant representative state or states, such as was shown in FIG. 2. Although not specifically illustrated in FIG. 4, the application of hysteresis, at either or both of steps 418 and 450 can take into account the prior state, either individual or representative, respectively, and a current time, in accordance with the hysteresis described in detail above. In one embodiment, such information can be trivially referenced, such as via a state variable or other like programming construct. Once the relevant hysteresis is applied, such as at step 450, processing can proceed to step 460 where output in accordance with the one or more representative states can be made.

As can be seen from the above descriptions, mechanisms for translating overlapping states into representative states have been enumerated. In view of the many possible variations of the subject matter described herein, we claim as our invention all such embodiments as may come within the scope of the following claims and equivalents thereto.

We claim:

1. A method of generating output from a computer-executable application program comprising multiple overlapping individual states, the method comprising the steps of:
   identifying a current status of the multiple overlapping individual states;
   identifying one or more representative states associated with the identified current status of the multiple overlapping individual states;
   identifying a highest ranked representative state, from among the identified one or more representative states, wherein all representative states are non-overlapping with all other representative states having a different ranking;
   applying a reset delay to delay transitioning away from the highest ranked representative state to a subsequent representative state;
   applying a set delay to delay transitioning to the highest ranked representative state from a prior representative state; the set delay and the reset delay having independently selected durations; and
   generating output in accordance with the highest ranked representative state.

2. The method of claim 1, wherein each of the multiple overlapping individual states is based on a function of the computer-executable application program.

3. The method of claim 1, wherein the generating the output comprises displaying information associated with the highest ranked representative state on a user interface.

4. The method of claim 1, further comprising the steps of applying at least one hysteresis mechanism to at least one of the multiple overlapping individual states, prior to the identifying the current status of the multiple overlapping individual states, to determine whether to delay a transition associated with the at least one of the multiple overlapping individual states to which the at least one hysteresis mechanism is being applied.

5. The method of claim 1, wherein the highest ranked representative state comprises two or more representative states that share a common ranking, the two or more representative states overlapping with each other.

6. One or more computer-readable storage media comprising computer-executable instructions associated with multiple overlapping individual states, the computer-executable instructions, when executed by a computing device, causing the computing device to perform steps comprising:
   identifying a current status of the multiple overlapping individual states;
   identifying one or more representative states associated with the identified current status of the multiple overlapping individual states;
   identifying a highest ranked representative state, from among the identified one or more representative states, wherein all representative states are non-overlapping with all other representative states having a different ranking;

applying a reset delay to delay transitioning away from the highest ranked representative state to a subsequent representative state;

applying a set delay to delay transitioning to the highest ranked representative state from a prior representative state; the set delay and the reset delay having independently selected durations; and generating output in accordance with the highest ranked representative state.

7. The computer-readable storage media of claim 6, wherein each of the multiple overlapping individual states is based on a function of the computer-executable instructions.

8. The computer-readable storage media of claim 6, wherein the generating the output comprises displaying information associated with the highest ranked representative state on a user interface.

9. The computer-readable storage media of claim 6, further comprising computer-executable instructions directed to applying at least one hysteresis mechanism to at least one of the multiple overlapping individual states, prior to the identifying the current status of the multiple overlapping individual states, to determine whether to delay a transition associated with the at least one of the multiple overlapping individual states to which the at least one hysteresis mechanism is being applied.

10. The computer-readable storage media of claim 6, wherein the highest ranked representative state comprises two or more representative states that share a common ranking, the two or more representative states overlapping with each other.

11. A computing device comprising:

a display device; and one or more computer-readable storage media, the computer-readable storage media comprising computer-executable instructions which, when executed by the computing device, cause the computing device to perform steps comprising:

identifying a current status of multiple overlapping individual states;

identifying one or more representative states associated with the identified current status of the multiple overlapping individual states;

identifying a highest ranked representative state, from among the identified one or more representative states, wherein all representative states are non-overlapping with all other representative states having a different ranking;

applying a reset delay to delay transitioning away from the highest ranked representative state to a subsequent representative state;

applying a set delay to delay transitioning to the highest ranked representative state from a prior representative state; the set delay and the reset delay having independently selected durations; and displaying, via the display device, output in accordance with the highest ranked representative state.

12. The computing device of claim 11, further comprising an application program configured to perform multiple functions; wherein each of the multiple overlapping individual states is based on one of the multiple functions.

13. The computing device of claim 11, wherein the computer-readable storage media comprise further computer-executable instructions directed to applying at least one hysteresis mechanism to at least one of the multiple overlapping individual states, prior to the identifying the current status of the multiple overlapping individual states, to determine whether to delay a transition associated with the at least one of the multiple overlapping individual states to which the at least one hysteresis mechanism is being applied.

14. The computing device of claim 11, wherein the highest ranked representative state comprises two or more representative states that share a common ranking, the two or more representative states overlapping with each other.

* * * * *